United States Patent
Melcher et al.

(10) Patent No.: US 11,295,362 B2
(45) Date of Patent: *Apr. 5, 2022

(54) SYSTEM AND METHOD TO CREATE LISTINGS USING IMAGE AND VOICE RECOGNITION

(71) Applicant: eBay Inc., San Jose, CA (US)

(72) Inventors: Ryan Melcher, Ben Lomond, CA (US); Dane Howard, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 16/654,535

(22) Filed: Oct. 16, 2019

(65) Prior Publication Data

US 2020/0118184 A1   Apr. 16, 2020

Related U.S. Application Data

(63) Continuation of application No. 15/417,582, filed on Jan. 27, 2017, now Pat. No. 10,489,835, which is a continuation of application No. 12/559,384, filed on Sep. 14, 2009, now Pat. No. 9,558,510.

(60) Provisional application No. 61/155,090, filed on Feb. 24, 2009.

(51) Int. Cl.
| | |
|---|---|
| *G06Q 30/00* | (2012.01) |
| *G06Q 30/06* | (2012.01) |
| *G06K 9/62* | (2022.01) |
| *G06Q 10/08* | (2012.01) |
| *G10L 15/22* | (2006.01) |

(52) U.S. Cl.
CPC ....... *G06Q 30/0601* (2013.01); *G06K 9/6215* (2013.01); *G06Q 10/087* (2013.01); *G06Q 30/0603* (2013.01); *G10L 15/22* (2013.01); *G10L 2015/223* (2013.01)

(58) Field of Classification Search
None
See application file for complete search history.

(56) References Cited

U.S. PATENT DOCUMENTS

| | | |
|---|---|---|
| 5,857,188 A | 1/1999 | Douglas |
| 7,376,263 B2 | 5/2008 | Kim et al. |
| 7,627,502 B2 | 12/2009 | Cheng et al. |
| 7,721,217 B2 | 5/2010 | Bonforte et al. |
| 7,792,703 B1 | 9/2010 | Amidon et al. |

(Continued)

OTHER PUBLICATIONS

Final Office Action received for U.S. Appl. No. 12/559,384, dated Jul. 12, 2011, 9 pages.

(Continued)

*Primary Examiner* — Naeem U Haq
(74) *Attorney, Agent, or Firm* — FIG. 1 Patents

(57) ABSTRACT

In various example embodiments, a system and method to provide services associated with an image is disclosed. The method includes receiving image data of an item of interest from a client device. The image data is used to identify a similar item from an image catalog based on the image data of the item. Attribute information associated with the similar item is retrieved and used to pre-populate a template. The pre-populated template is sent to the client device, and modified data from the client device is received in response, with the modified data resulting in a final template. A listing based on the final template is generated.

20 Claims, 8 Drawing Sheets

(56) References Cited

U.S. PATENT DOCUMENTS

| | | | |
|---|---|---|---|
| 7,991,646 B2 | 8/2011 | Lewis et al. | |
| 8,656,269 B1 | 2/2014 | Yuasa et al. | |
| 9,495,386 B2 | 11/2016 | Tapley et al. | |
| 9,558,510 B2 | 1/2017 | Melcher et al. | |
| 10,489,835 B2 | 11/2019 | Melcher et al. | |
| 2002/0188527 A1* | 12/2002 | Dillard | G06Q 30/0601 705/26.1 |
| 2003/0163386 A1 | 8/2003 | Narita et al. | |
| 2006/0004586 A1* | 1/2006 | Graf | G06Q 30/06 705/1.1 |
| 2008/0133305 A1 | 6/2008 | Yates et al. | |
| 2008/0154898 A1 | 6/2008 | Cheng et al. | |
| 2009/0304267 A1 | 12/2009 | Tapley et al. | |
| 2010/0198700 A1* | 8/2010 | Ramaswamy | G06Q 30/0601 705/26.1 |
| 2010/0217684 A1 | 8/2010 | Melcher et al. | |
| 2013/0013529 A1* | 1/2013 | Chheda | G06Q 40/02 705/342 |
| 2013/0036029 A1* | 2/2013 | Patt | G06Q 30/08 705/27.1 |
| 2013/0173421 A1* | 7/2013 | Bandara | G06Q 20/12 705/26.8 |
| 2013/0346200 A1* | 12/2013 | Bandara | G06Q 30/0601 705/14.53 |
| 2015/0324394 A1 | 11/2015 | Becker et al. | |
| 2016/0055154 A1 | 2/2016 | Surack et al. | |
| 2016/0154893 A1* | 6/2016 | Ochiai | G06F 16/958 707/702 |
| 2016/0189267 A1* | 6/2016 | Velusamy | H04L 67/306 705/26.61 |
| 2017/0140446 A1 | 5/2017 | Melcher et al. | |
| 2018/0033016 A1* | 2/2018 | Mayman | G06Q 10/20 |
| 2018/0341907 A1* | 11/2018 | Tucker | G06Q 30/0623 |
| 2018/0349851 A1* | 12/2018 | Gupta | G06Q 10/087 |

OTHER PUBLICATIONS

Final Office Action received for U.S. Appl. No. 12/559,384, dated Jul. 15, 2015, 13 pages.
Non-Final Office action received for U.S. Appl. No. 12/559,384, dated Jan. 7, 2011, 9 pages.
Non-Final Office action received for U.S. Appl. No. 12/559,384 dated Dec. 10, 2014,10 pages.
Non-Final Office action received for U.S. Appl. No. 12/559,384 dated Jun. 3, 2016, 8 pages.
Non-Final Office action received for U.S. Appl. No. 12/559,384, dated Jun. 19, 2014, 9 pages.
Notice of Allowance received for U.S. Appl. No. 12/559,384, dated Sep. 23, 2016, 9 pages.
Response to Final Office Action filed on Oct. 15, 2015 for U.S. Appl. No. 12/559,384, dated Jul. 15, 2015, 18 pages.
Response to Final Office Action filed on Sep. 9, 2011 for U.S. Appl. No. 12/559,384, dated Jul. 12, 2011, 11 pages.
Response to Final Office Action filed on Sep. 18, 2014 for U.S. Appl. No. 12/559,384, dated Jun. 19, 2014, 12 pages.
Response to Non-Final Office Action filed on Apr. 10, 2015 for U.S. Appl. No. 12/559,384, dated Dec. 10, 2015, 28 pages.
Response to Non-Final Office Action filed on Apr. 25, 2011 for U.S. Appl. No. 12/559,384, dated Jan. 7, 2011, 11 pages.
Response to Non-Final Office Action filed on Sep. 1, 2016 for U.S. Appl. No. 12/559,384, dated Jun. 3, 2016, 14 pages.
Max, "Do-It-Yourself Selling", CNN Money, Jun. 7, 2004, 2 pages.
Mehtre et al., "Color Matching for Image Retrieval", Pattern Recognition Letters, vol. 16, Issue 3, Mar. 1995, pp. 325-331.
Parrott et al., "For Sale By Owner: The Right Choice For You?", University of Nebraska-Lincoln, Jan. 1987, 7 pages.
Varish et al., "Content Based Image Retrieval Using Statistical Features of Color Histogram", 3rd International Conference on Signal Processing, Communication and Networking (ICSCN), Mar. 26-28, 2015, 2 pages.
Amendment Under 37 CFR 1.312 filed on Oct. 3, 2019 for U.S. Appl. No. 15/417,582, 7 pages.
Non-Final Office action received for U.S. Appl. No. 15/417,582, dated Apr. 11, 2019, 8 pages.
Notice of Allowance received for U.S. Appl. No. 15/417,582, dated Jul. 3, 2019, 8 pages.
Preliminary Amendment filed on Jan. 27, 2017 for U.S. Appl. No. 15/417,582, 8 pages.
PTO Response Rule 312 Communication Received for U.S. Appl. No. 15/417,582, dated Oct. 22, 2019, 3 pages.
Response to Non-Final Office Action filed on Apr. 18, 2019 for U.S. Appl. No. 15/417,582, dated Apr. 11, 2019, 8 pages.

\* cited by examiner

SYSTEM AND METHOD TO CREATE LISTINGS USING IMAGE AND VOICE RECOGNITION

RELATED APPLICATIONS

The present application is a continuation of U.S. application Ser. No. 15/417,582, filed Jan. 27, 2017, which is a continuation of U.S. application Ser. No. 12/559,384, filed Sep. 14, 2009, now U.S. Pat. No. 9,558,510, which claims the priority benefit of US Provisional Patent Application No. 61/155,090, filed Feb. 24, 2009, each of which is hereby incorporated by reference in its entirety.

FIELD

The present disclosure relates generally to the field of computer technology, and in a specific example embodiment, to creating listings pertaining to an item associated with image data.

BACKGROUND

Websites provide a number of publishing, listing, and price-setting mechanisms whereby a publisher (e.g., a seller) may list or publish information concerning items for sale. A buyer can express interest in or indicate a desire to purchase such items by, for example, submitting a query to the website for use in a search for the requested items. The process of creating a listing may be a time-consuming and tedious process.

BRIEF DESCRIPTION OF DRAWINGS

Various ones of the appended drawings merely illustrate example embodiments of the present invention and cannot be considered as limiting its scope.

DETAILED DESCRIPTION

Figure 1:
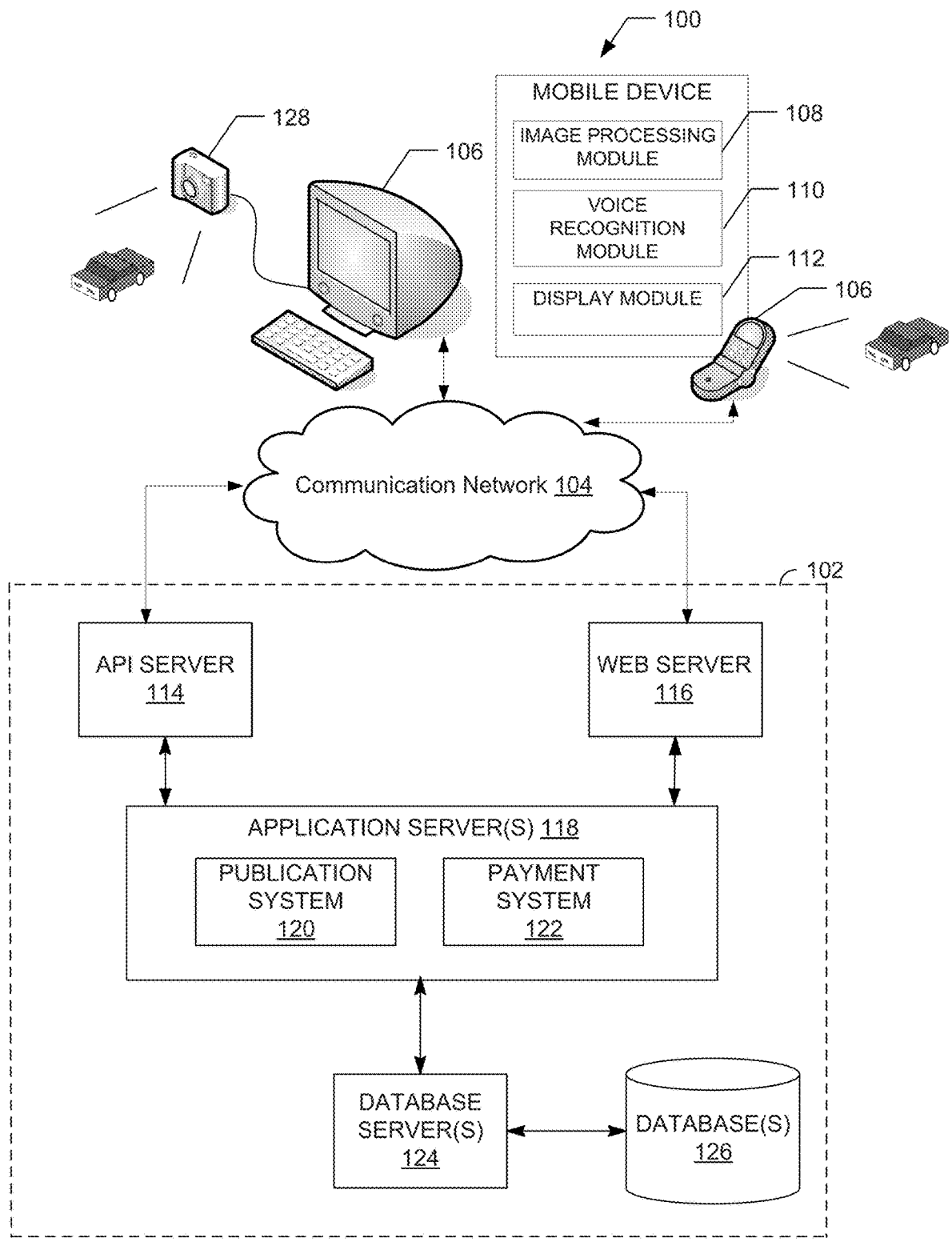
FIG. 1 is a block diagram illustrating an example embodiment of a network architecture of a system used to identify items depicted in images.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a network-based publication environment, the embodiments are given merely for clarity in disclosure. Thus, any type of electronic publication, electronic commerce, or electronic business system and method, including various system architectures, may employ various embodiments of the listing creation system and method described herein and be considered as being within a scope of example embodiments. Each of a variety of example embodiments is discussed in detail below.

Example embodiments described herein provide systems and methods to create listings using image data recognition. Image data, such as an image of an item of interest, is received and techniques for identifying the item are applied to determine one or more similar items in a catalog of items. Attribute information for a selected item from the one or more similar items is obtained from the catalog and used to pre-populate a template for listing generation. Modified data may be received from a client device which modifies the pre-populated template into a final template. Using the final template, the listing may be automatically generated. In some embodiments, the modified data may be obtained using text or voice recognition. Furthermore, the listing may comprise any type of display of the item, including, for example, a product listing, advertisement, or publication.

Stored images depicting a variety of items are stored in a repository of, for example, a network-based publication system such as a network-based marketplace (e.g., an online shopping website or an online auction website) resulting in the image catalog. Users may submit these images for inclusion in item postings, advertisements, or other publications. As explained in more detail below, an item depicted in an image may be identified by matching the image with user-submitted images or purchased catalogs of images stored in a database or repository associated with the network-based publication system.

It should be noted that submission of image data of an item of interest for identification may be used in a variety of different applications. As used herein, an "item" refers to any tangible or intangible thing or something that has a distinct, separate existence from other things (e.g., goods, services, electronic files, web pages, electronic documents, or land). For example, in addition to a sale of the item, a user may submit image data of the item to a price comparison service (at a price comparison manager), in accordance with an example embodiment. This price comparison service can identify the item and deliver shopping comparison results associated with the item. In another embodiment, a user can submit image data to a search engine of a search manager (e.g., Internet search engine or website search engine), and the search engine can then retrieve websites or other information associated with the item depicted in the image. In yet another embodiment, a user can submit the image data to an online auction website that can identify the item depicted by the image data and return a pre-populated template associated with the item to the user such that the user may then modify the pre-populated template, if necessary, for use in generating a listing. The listing may be used for auctioning the item on the online auction website.

With reference to FIG. 1, an example embodiment of a high-level client-server-based network architecture 100 to create listings is shown. A networked system 102, in an example form of a network-server-side functionality, is coupled via a communication network 104 (e.g., the Internet or a Wide Area Network (WAN)) to one or more client devices 106. FIG. 1 illustrates, for example, client devices 106 which may operate via a browser (e.g., such as the INTERNET EXPLORER® browser developed by Microsoft® Corporation of Redmond, Wash. State).

The client devices 106 may include, for example, a personal computer or a mobile phone, as illustrated. The client devices 106 may comprise an image processing module 108 to process image data received from a camera coupled to the client processing system, a voice recognition module 110 to receive audio input via a microphone coupled to the client processing system, and a display module 112 to display information (e.g., in the form of user interfaces). The voice recognition module 110 is further, in one example embodiment, configured to generate text or graphical input based on voice data received via the microphone.

An Application Program Interface (API) server 114 and a web server 116 are coupled to, and provide programmatic and web interfaces respectively to, one or more application servers 118. The application servers 118 host a publication system 120 and a payment system 122, each of which may comprise one or more modules, applications, or engines, and each of which may be embodied as hardware, software, firmware, or any combination thereof. The application servers 118 are, in turn, coupled to one or more database servers 124 facilitating access to one or more information storage repositories or database(s) 126.

The publication system 120 provides a number of publication and marketplace functions and services to users that access the networked system 102. The publication system 120 is discussed in more detail in connection with FIG. 2.

The payment system 122 provides a number of payment services and functions to users. The payment system 122 allows users to accumulate value (e.g., in a commercial currency, such as the U.S. dollar, or a proprietary currency, such as "points") in accounts, and then later to redeem the accumulated value for products (e.g., goods or services) that are made available via the publication system 120. The payment system 122 also facilitates payments from a payment mechanism (e.g., a bank account or credit card) for purchases of items via the network-based marketplace. While the publication system 120 and the payment system 122 are shown in FIG. 1 to both form part of the networked system 102, it will be appreciated that, in alternative embodiments, the payment system 122 may form part of a payment service that is separate and distinct from the networked system 102.

In some embodiments, the client device 106 captures and transmits an image of an item of interest (depicted as a toy car) to the networked system 102. The image may be captured by a camera built into the client device 106 or by a digital camera 128, which is configurable to download its stored images to the client device 106. In some cases, the image may be a representation of the item of interest (e.g., barcode for the item). Alternatively, the user may locate the image through, for example, the Internet or other image repositories (e.g., using the browser). Additionally, the client device 106 may capture a verbal description of the item of interest. Images (both captured and obtained from other sources) and verbal descriptions are herein collectively referred to as image data.

The image data is then used by the networked system 102 for identification and list creation processing. In one embodiment, components of the networked system 102 compare the image data to a catalog of items. The catalog may be organized as a matrix of data including multiple attributes associated with each item. For example, each item in the catalog may comprise an image, title, subtitle, category, sub-category, related item listings, average price, quantities of the item currently available, templates associated with the items, and any other data that may describe and distinguish the item from other items in the catalog. The catalog is a dynamic catalog. That is, as new items are listed or become known to the networked system 102, the new items will be added to the catalog. In one embodiment, the catalog may be stored in the database 126.

In a further embodiment, a global positioning system (not shown) may be attached to, or included in, the client device 106. As such, the client device 106 can transmit coordinates or locations identified by the global positioning system to the networked system 102. Using the coordinates or location, the networked system 102 may, for example, locate nearby stores that sell the item depicted by the image data based on the attributes stored in the catalog.

While the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system. The publication system 120 and payment system 122 may also be implemented as standalone systems or standalone software programs operating under separate hardware platforms, which do not necessarily have networking capabilities.

Figure 2:
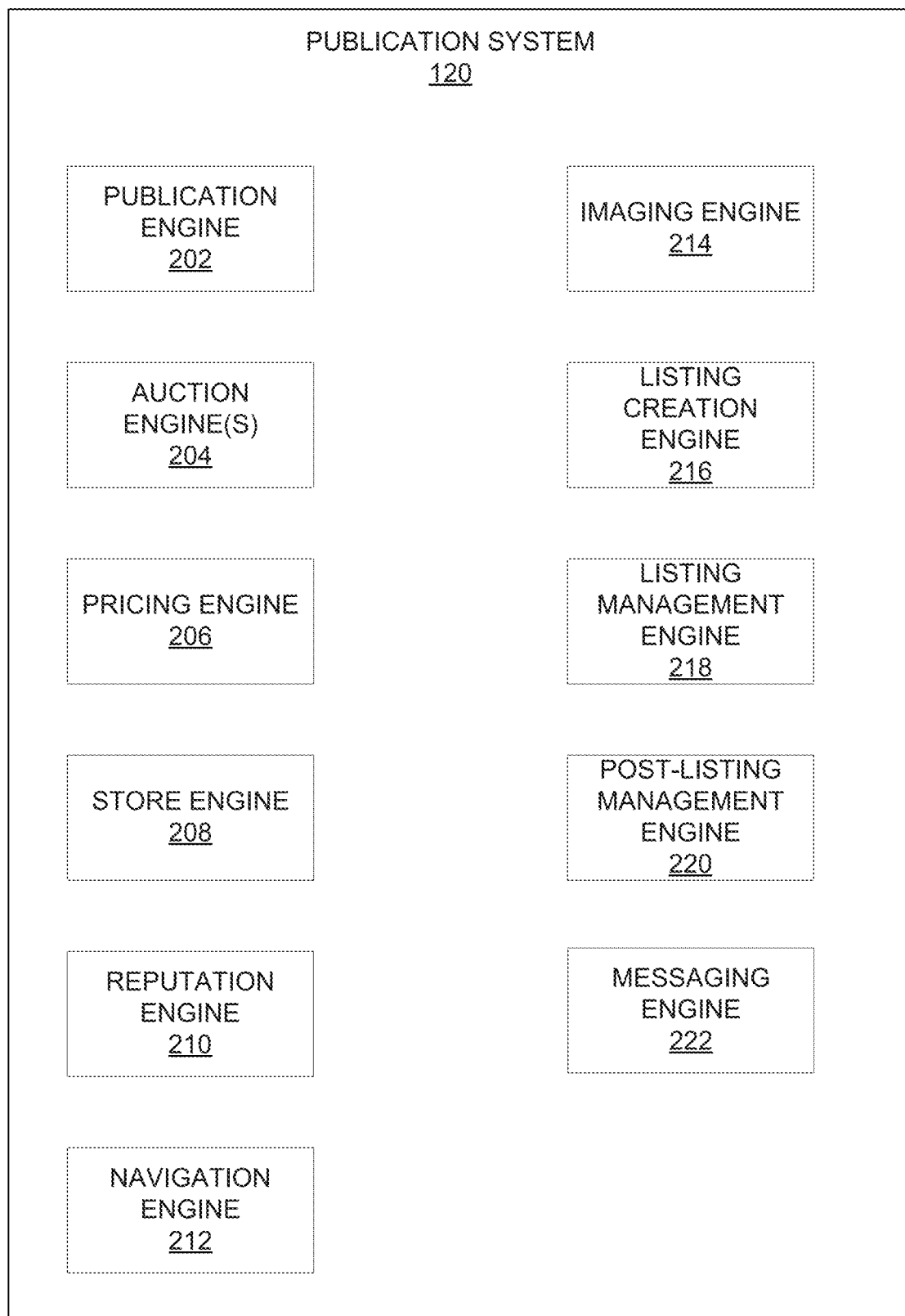
FIG. 2 is a block diagram illustrating an example embodiment of a publication system.

Referring now to FIG. 2, an example block diagram illustrating multiple components that, in one example embodiment, are provided within the publication system 120 of the networked system 102 (see FIG. 1) is shown. The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more database(s) 126 via the one or more database servers 124, both shown in FIG. 1.

In one embodiment, the publication system 120 provides a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication system 120 may comprise at least one publication engine 202 and one or more auction engines 204 that support auction-format listing and price setting mechanisms (e.g., English, Dutch, Chinese, Double, Reverse auctions, etc.). The various auction engines 204 also provide a number of features in support of these auction-format listings, such as a reserve price feature whereby a seller may specify a reserve price in connection with a listing and a proxy-bidding feature whereby a bidder may invoke automated proxy bidding.

A pricing engine 206 supports various price listing formats. One such format is a fixed-price listing format (e.g., the traditional classified advertisement-type listing or a catalog listing). Another format comprises a buyout-type listing. Buyout-type listings (e.g., the Buy-It-Now (BIN) technology developed by eBay Inc., of San Jose, Calif.) may be offered in conjunction with auction-format listings and allow a buyer to purchase goods or services, which are also being offered for sale via an auction, for a fixed price that is typically higher than a starting price of an auction for an item.

A store engine 208 allows a seller to group listings within a "virtual" store, which may be branded and otherwise personalized by and for the seller. Such a virtual store may also offer promotions, incentives, and features that are specific and personalized to the seller. In one example, the seller may offer a plurality of items as Buy-It-Now items in the virtual store, offer a plurality of items for auction, or a combination of both.

A reputation engine 210 allows users that transact, utilizing the networked system 102, to establish, build, and maintain reputations. These reputations may be made available and published to potential trading partners. Because the publication system 120 supports person-to-person trading between unknown entities, users may otherwise have no history or other reference information whereby the trustworthiness and credibility of potential trading partners may be assessed. The reputation engine 210 allows a user, for example through feedback provided by one or more other transaction partners, to establish a reputation within the network-based publication system over time. Other potential trading partners may then reference the reputation for purposes of assessing credibility and trustworthiness.

Navigation of the network-based publication system may be facilitated by a navigation engine 212. For example, a search module (not shown) of the navigation engine 212 enables keyword searches of listings published via the publication system 120. In a further example, a browse module (not shown) of the navigation engine 212 allows users to browse various category, catalog, or inventory data structures according to which listings may be classified within the publication system 120. Various other navigation applications within the navigation engine 212 may be provided to supplement the searching and browsing applications.

In order to make listings available via the networked system 102 as visually informing and attractive as possible, the publication system 120 may include an imaging engine 214 that enables users to upload images for inclusion within listings and to incorporate images within viewed listings. The imaging engine 214 also receives image data from a user and utilizes the image data to identify an item depicted or described by the image data. The imaging engine 214 will be discussed in more detail in connection with FIG. 3 below.

A listing creation engine 216 allows sellers to conveniently author listings of items. In one embodiment, the listings pertain to goods or services that a user (e.g., a seller) wishes to transact via the publication system 120. In other embodiments, a user may create a listing that is an advertisement or other form of publication. The listing creation engine 216 will be discussed in more detail in connection with FIG. 4.

A listing management engine 218 allows sellers to manage such listings. Specifically, where a particular seller has authored or published a large number of listings, the management of such listings may present a challenge. The listing management engine 218 provides a number of features (e.g., auto-relisting, inventory level monitors, etc.) to assist the seller in managing such listings.

A post-listing management engine 220 also assists sellers with a number of activities that typically occur post-listing. For example, upon completion of an auction facilitated by the one or more auction engines 204, a seller may wish to leave feedback regarding a particular buyer. To this end, the post-listing management engine 220 provides an interface to the reputation engine 210 allowing the seller to conveniently provide feedback regarding multiple buyers to the reputation engine 210.

A messaging engine 222 is responsible for the generation and delivery of messages to users of the networked system 102. Such messages include, for example, advising users regarding the status of listings and best offers (e.g., providing an acceptance notice to a buyer who made a best offer to a seller). The messaging engine 222 may utilize any one of a number of message delivery networks and platforms to deliver messages to users. For example, the messaging engine 222 may deliver electronic mail (e-mail), an instant message (IM), a Short Message Service (SMS), text, facsimile, or voice (e.g., Voice over IP (VoIP)) messages via wired networks (e.g., the Internet), a Plain Old Telephone Service (POTS) network, or wireless networks (e.g., mobile, cellular, WiFi, WiMAX).

Although the various components of the publication system 120 have been defined in terms of a variety of individual modules and engines, a skilled artisan will recognize that many of the items can be combined or organized in other ways. Furthermore, not all components of the publication system 120 have been included in FIG. 2. In general, components, protocols, structures, and techniques not directly related to functions of example embodiments (e.g., dispute resolution engine, loyalty promotion engine, personalization engines, etc.) have not been shown or discussed in detail. The description given herein simply provides a variety of example embodiments to aid the reader in an understanding of the systems and methods used herein.

Figure 3:
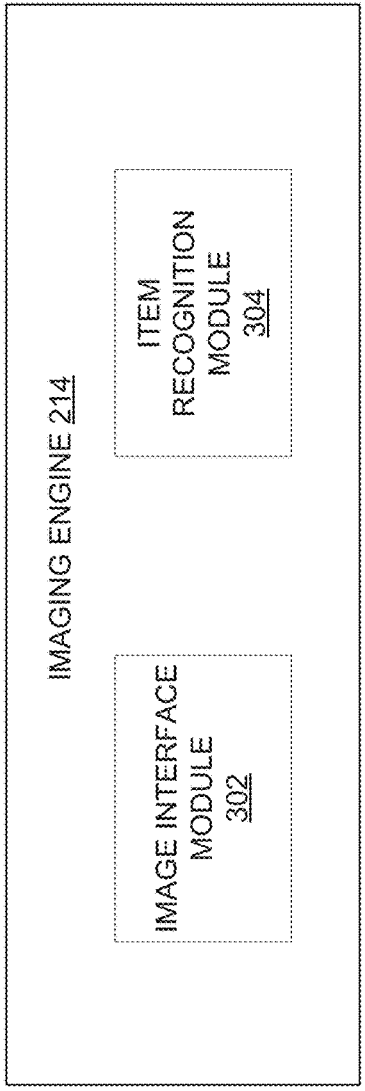
FIG. 3 is a block diagram illustrating an example embodiment of an imaging engine.

Application of Embodiments of the Listing Creation Platform into the Example Network Architecture Referring now to FIG. 3, an example diagram of the imaging engine 214 is shown. The imaging engine 214, in conjunction with the listing creation engine 216, provides mechanisms to create listings by comparing image data received from the client device 106 with stored images and their attributes (collectively referred to as catalog image data). The catalog image data may be contained within an image catalog stored on a storage device associated with the networked system 102. In one embodiment, the image catalog is stored in one or more of the databases 126.

In example embodiments, the imaging engine 214 comprises an imaging interface module 302 and an item recognition module 304. Alternative embodiments may comprise further components or modules not directly related to example embodiments of the present invention, and thus are not shown or discussed. Furthermore, some of the components of the imaging engine 214 may be located elsewhere (e.g., in the listing creation engine 216) or be located at the client device.

The imaging interface module 302 provides a graphical user interface for user interaction with the various modules of the imaging engine 214 and listing creation engine 216. In example embodiments, the graphical user interface allows the user to upload image data for use in creating a listing as is discussed in more detail below. The graphical user interface may provide guidance to the user when uploading the image data. In one embodiment, the graphical user interface allows the user to narrow down to a category or sub-category of a product infrastructure, thus simplifying the item recognition process.

The item recognition module 304 is configured to identify the item depicted by the image data. The item is identified by comparing the image data with the catalog image data to determine a match. The identification of an item of the image data may be performed in any number of ways. In one embodiment, the item recognition module 304 locates items having catalog image data with a predetermined or threshold degree of similarity to the uploaded image data. Thus, the uploaded image data may be compared against a collection of catalog image data within the catalog to determine one or more similar items. The collection of catalog image data may be user-provided or obtained from various public or commercial sources. The item recognition module 304 may use various recognition techniques, described in further detail below, to identify the item depicted by the uploaded image data.

In one embodiment, the item recognition module 304 uses a neural network component configured to identify one or more items depicted by the uploaded image data through learning and training. As an example, the neural network component can identify matches between images based on learning algorithms. The neural network component gathers representative data and invokes learning algorithms to automatically learn the structure of the data. A Java Object Oriented Neural Engine is an example of a neural network component. Other examples of neural network components include Feed Forward Neural Networks, Recursive Neural Networks (e.g., Elman and Jordan), Time Delay Neural Networks, Standard Back-Propagation Neural Networks (e.g., Gradient Descent, on-line, and batch), Resilient Back-Propagation (RPROP) Neural Networks, Kohonen Self-Organizing Maps (e.g., with WTA or Gaussian output maps), Principal Component Analysis, and Module Neural Networks.

An image tool component may also be included in the item recognition module 304. The image tool component may apply an edge detection algorithm to detect, draw, enhance, or highlight lines, areas, or points of contrast in an image. Another example is the application of a Canny edge detector algorithm to extrapolate contrasts of the images. The contrasts effectively serve to highlight the lines, points, or areas that define the item, and the detection of these lines, points, or areas increases the probability of identifying a match between two or more images. Further examples of image algorithms that may be applied to the images include Marching Squares Algorithm and Haar wavelet.

In some embodiments, an uploaded image is converted into color histograms, which are representations of distributions of colors in the uploaded image. The color histogram of the uploaded image is then compared with the color histograms of the stored images in the catalog to determine a match. As an example, a neural network component compares the color histograms to generate a statistical analysis of the comparison. The statistical analysis may identify a statistical difference or a statistical similarity between the compared color histograms. The match (most similar item) is based on the resulting statistical analysis.

The item recognition module 304 then returns a result of the item recognition processing. In one embodiment, only the most similar item will be returned. In an alternative embodiment, a set of statistical analysis and associated items and their identifiers are returned. As an example, item identifiers can be correlated with statistical differences using name value pairs, such as "DVD player: 00040040." The user may manually confirm or select the most similar item based on the results.

Once the most similar item is selected, an item identifier associated with the selected item may be associated with the uploaded image data. In the example above, if the item identifier "DVD player: 00040040" is associated with the selected item from the catalog, then the "DVD player: 00040040" may be associated with the uploaded image data. It should be appreciated that in addition to the application of the edge detector algorithm and the comparison with other images as discussed above, other item recognition processes may also be applied to identify items described by image data, in accordance with other embodiments.

Figure 4:
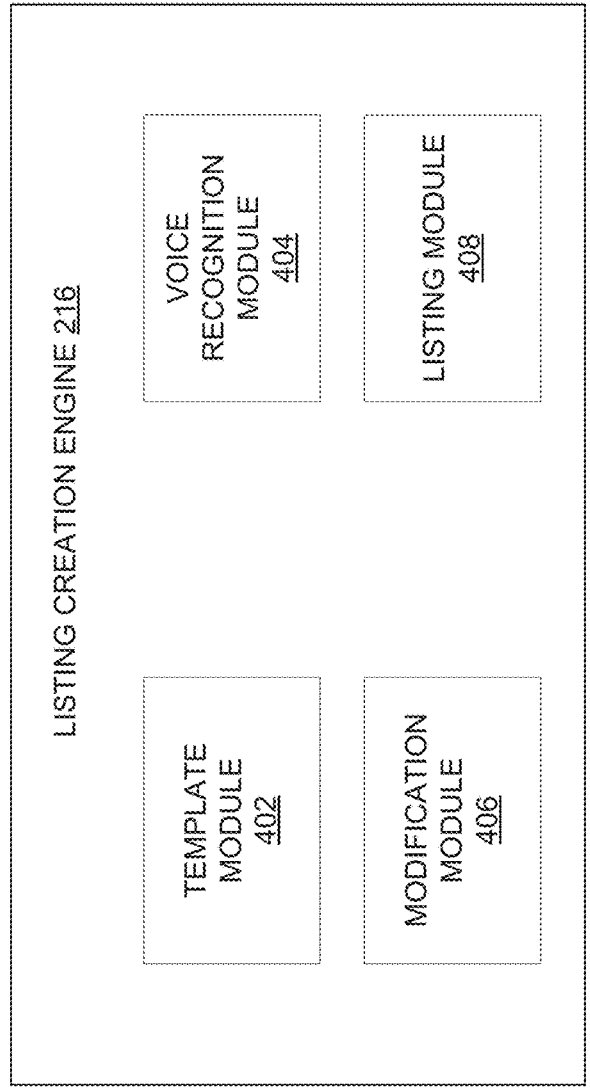
FIG. 4 is a block diagram illustrating an example embodiment of a listing creation engine.

FIG. 4 illustrates an embodiment of the listing creation engine 216. The listing creation engine 216 comprises a template module 402, a voice recognition module 404, a modification module 406, and a listing module 408. Alternative embodiments may comprise further components or modules not directly related to example embodiments of the user-generated imaging system, and thus are not shown or discussed. Furthermore, some of the components of the listing creation engine 216 may be located elsewhere (e.g., in the imaging engine 214) or be located at the client device.

The template module 402 retrieves attribute data associated with the selected item from the catalog and uses the attribute data to pre-populate a template. In one embodiment, the template module 402 takes the item identifier determined by the item recognition module 304 or selected by the user (e.g., when more than one similar item is returned in the search) and retrieves attribute information from the catalog that correspond with the item identifier. In another embodiment, the attribute information may be automatically retrieved during the item recognition process when a single similar item is determined. The attribute information is then used to pre-populate a template. The template may then be provided back to the client device 106 that sent the image data.

The voice recognition module 404 manages voice data. The user at the client device 106 may verbally modify the template (e.g., provide supplemental data or edit existing data). In some embodiments, the voice data is captured by the client processing system 106 and transmitted to the voice recognition module 404. The voice recognition module 404 converts the voice data into text data that is used to modify the pre-populated template.

In some embodiments, the voice data may be processed at the client device 106. In these embodiments, the voice recognition module 110 at the client device 106 converts the voice data into text data. The text data may then be used to modify the pre-populated template at the client device 106. Alternatively, the text data may be sent back to the modification module 406 which uses the text data to modify the pre-populated template.

The modification module 406 manages modifications to the pre-populated template. In embodiments where the voice recognition module 404 of the listing creation engine 216 converts the voice data to text data, the modification module 406 takes the text data and modifies the pre-populated template. In embodiments, where the client device 106 converts the voice data (e.g., using voice recognition module 110), the modification module 406 receives the modified data (e.g., in the form of the modified pre-populated template). Alternatively, the modification module 406 receives the converted text data from the client device 106 and uses the text data to modify the pre-populated template. Modification of the pre-populated template results in a final template that may be used to generate the listing.

The listing module 408 generates the listing using the final template. The final template comprises attribute information for the item depicted by the image data as well as any modified data received from the user. Using the attribute information and modified data, a listing may be generated. The listing may include an image of the item (e.g., the image data when the image data is a captured image of the item or image from catalog). In various embodiments, the listing may be a listing for publication to the network-based publication system, advertisements, or other publications. For example, the listing may be an item listing published to an online auction site.

Figure 5:
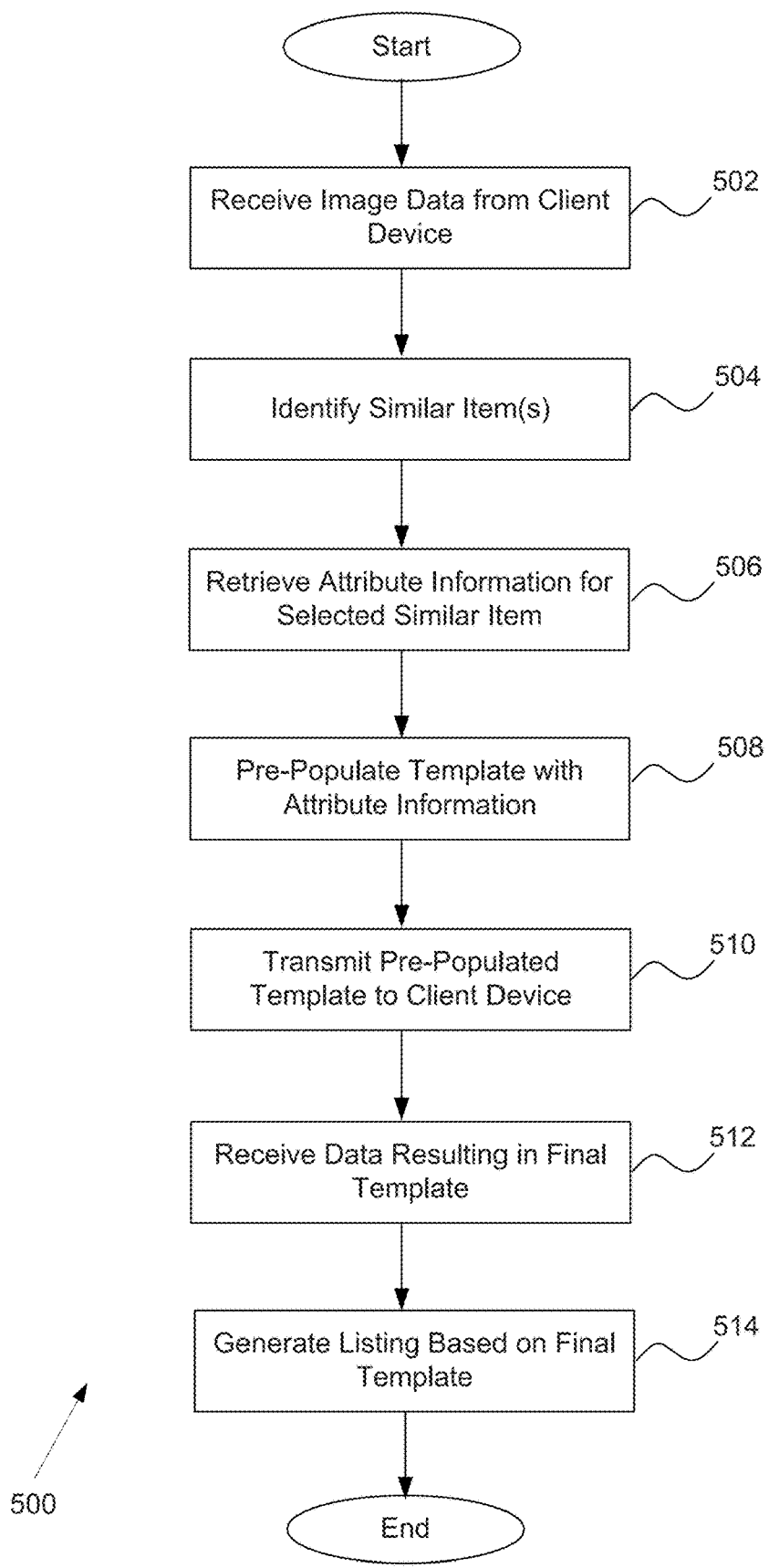
FIG. 5 is a flow diagram of an example method for creating a listing using image data recognition.

FIG. 5 is a flow diagram of an example method 500 for creating a listing using image recognition. At operation 502, image data is received from the client device 106. The image data may comprise an uploaded image captured or selected at the client device 106. Alternatively, the image data may comprise a verbal description of an item. In one embodiment, the image data is received via the image interface module 302.

At operation 504, one or more similar items to the item depicted in the image data are identified. In example embodiments, the item recognition module 304 performs a matching process to determine one or more most similar items. In some cases, the matching process is based on matching an uploaded image with stored images in the catalog. In other cases, the matching process is based on matching a verbal description of the item with attribute information stored for items in the catalog.

The attribute information for a selected similar item is retrieved at operation 506. In the case where only a most similar item (also referred to as a selected item) is automatically determined in operation 504, the attribute information may be automatically retrieved from the catalog at substantially the same time as operation 504. Alternatively, in an embodiment where more than one similar item is returned from operation 504, a user at the client device 106 may select one of the similar items (referred to as the selected item). Based on this selection, the attribute information may then be retrieved from the catalog.

Using the retrieved attribute information, a template may be pre-populated at operation 508. The template comprises a basic collection of information regarding the item associated with the user that may be subsequently used to generate a listing or perform other actions (e.g., perform a web-based search). The retrieved attribute information may pre-populate any number of fields in the template. In one embodiment, the template is generated by the template module 402. The pre-populated template is then transmitted back to the user of the client device 106 at operation 510. It should be noted that the template may be in any form. For example, the template may simply be a listing of attribute information without any formatting, which may be subsequently formatted by the client device 106 for display.

At operation 512, modified data is received which results in a final template that is used to generate the listing. The modified data may comprise the final template itself in accordance with one embodiment. In another embodiment, the modified data may comprise text data (e.g., received from the voice recognition module 110 of the client device or from a keyboard device of the client device) that is used to update the pre-populated template to generate the final template. In yet another embodiment, the modified data may comprise voice data. The voice data is converted to text data by the voice recognition module 404, and the text data is used to modify the pre-populated template into the final template.

In example embodiments, the final template comprises a collection of attribute information that may be used to generate the listing for the item of interest. In operation 514, the listing is generated based on the final template.

Figure 6:
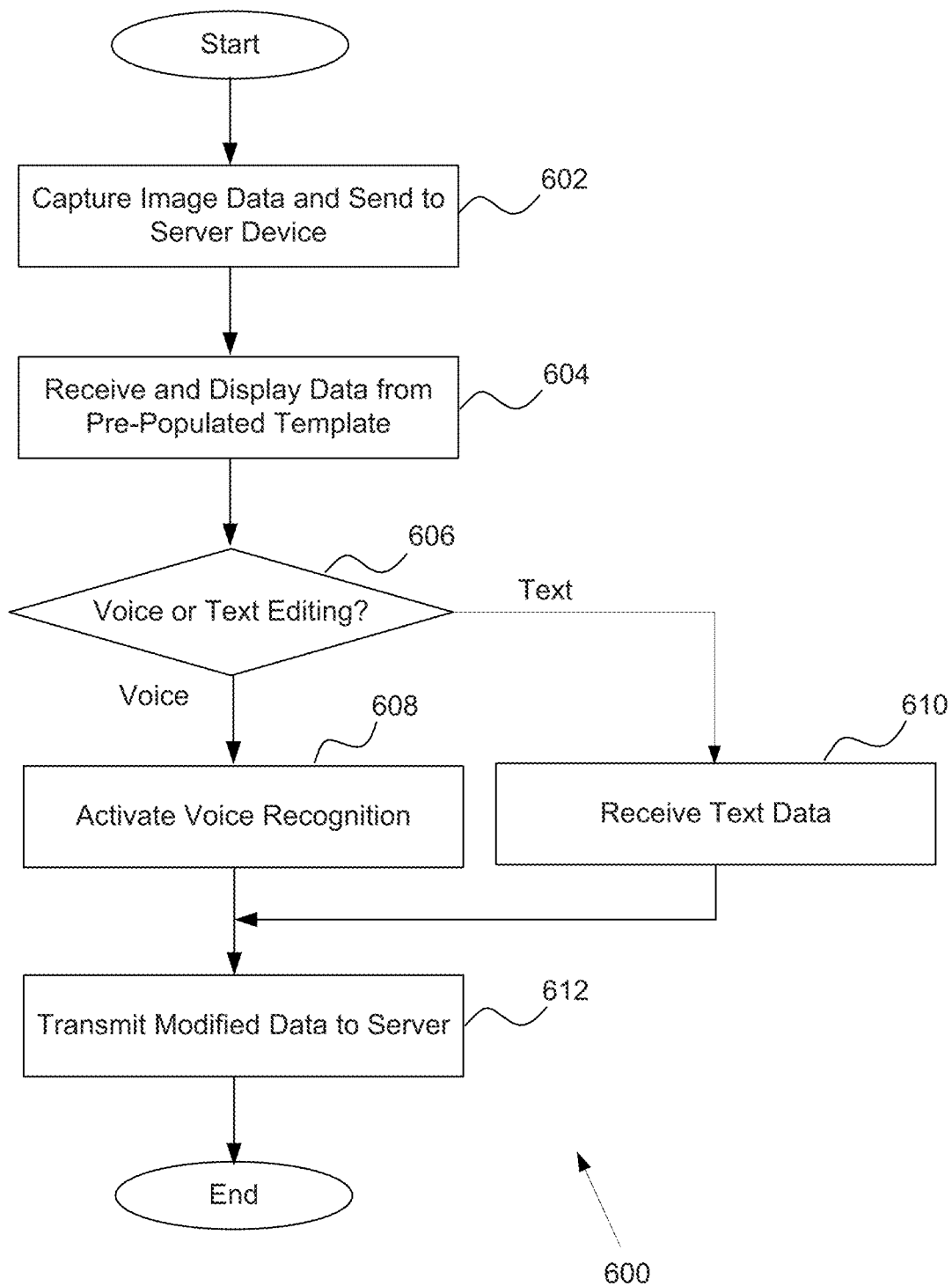
FIG. 6 is a flow diagram of an example method for processing data at a client device.

FIG. 6 is a flow diagram of an example method 600 for processing data at a client device (e.g., the client device 106). At operation 602, a user associated with the client device 106 captures image data of an item of interest and sends the image data to the networked system 102. In some embodiments, the image data is an image of the item of interest captured by a camera device associated with the client device 106. In other embodiments, the image data may comprise a verbal description of the item of interest captured by a microphone.

Based on the image data, a pre-populated template is received from the networked system 102 and displayed at operation 604. As discussed with reference to FIG. 5, the pre-populated template comprises a basic collection of information regarding the item of interest. The pre-populated template may be in any form. In one example, the pre-populated template is a listing of attribute information without any formatting, which is then formatted by the client device 106 for display at operation 604

At operation 606, a determination is made as to whether the pre-populated template will be edited by voice or text. The pre-populated template may contain incorrect data or may be incomplete. Thus, the pre-populated template may be edited by the user. It should be noted that operation 606 is optional. In some cases, the user may decide that no modifications are needed to the pre-populated template. In these cases, the pre-populated template may be sent back to the networked system 102 or an indication that no modifications to the pre-populated template may be sent back to the networked system 102.

If voice editing is used, then the voice recognition process is activated at operation 608. In an example embodiment, the voice recognition module 110 at the client device 106 receives voice data from the user. In some embodiments, the voice data may be converted to text data and used to modify the pre-populated template at the client device 106. In other embodiments, the voice data may be received by the voice recognition module 110 and sent to the voice recognition module 404 at the networked system 102 for further processing.

If text editing is used, that text data is received at operation 610. In example embodiments, the user may use a keyboard associated with the client device 106 to enter text data.

At operation 612, the modified data is sent to the networked system 102. In some embodiments, the modified data may comprise the template updated with the voice or text data (herein referred to as the final template). In other embodiments, the modified data may comprise the voice or text data itself which is sent back to the modification module 406. The modification module 406 uses the modified data to update the pre-populated template into the final template.

Figure 7A:
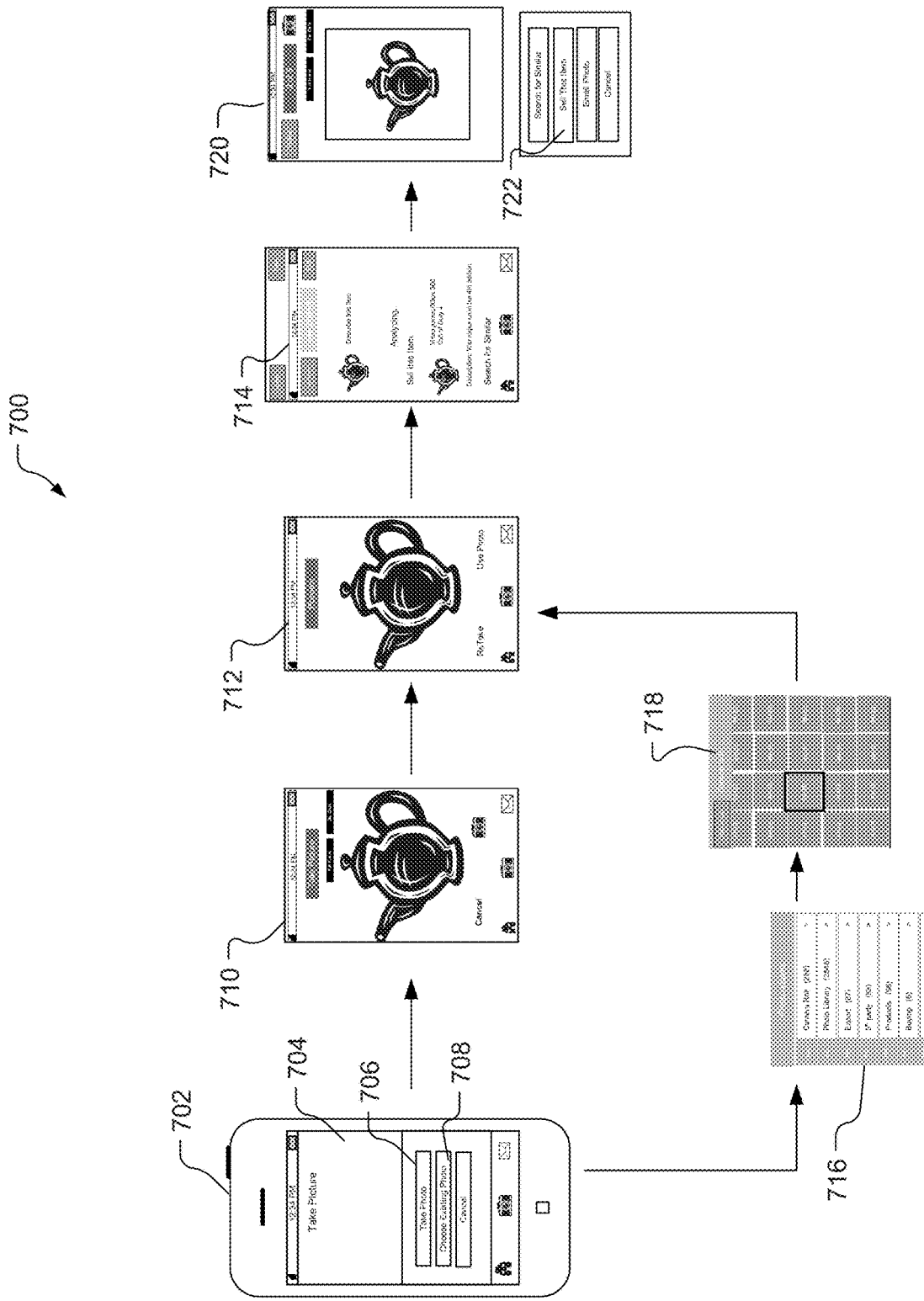
FIG. 7a-FIG. 7b are example user interfaces used to create the publication.
Figure 7B:
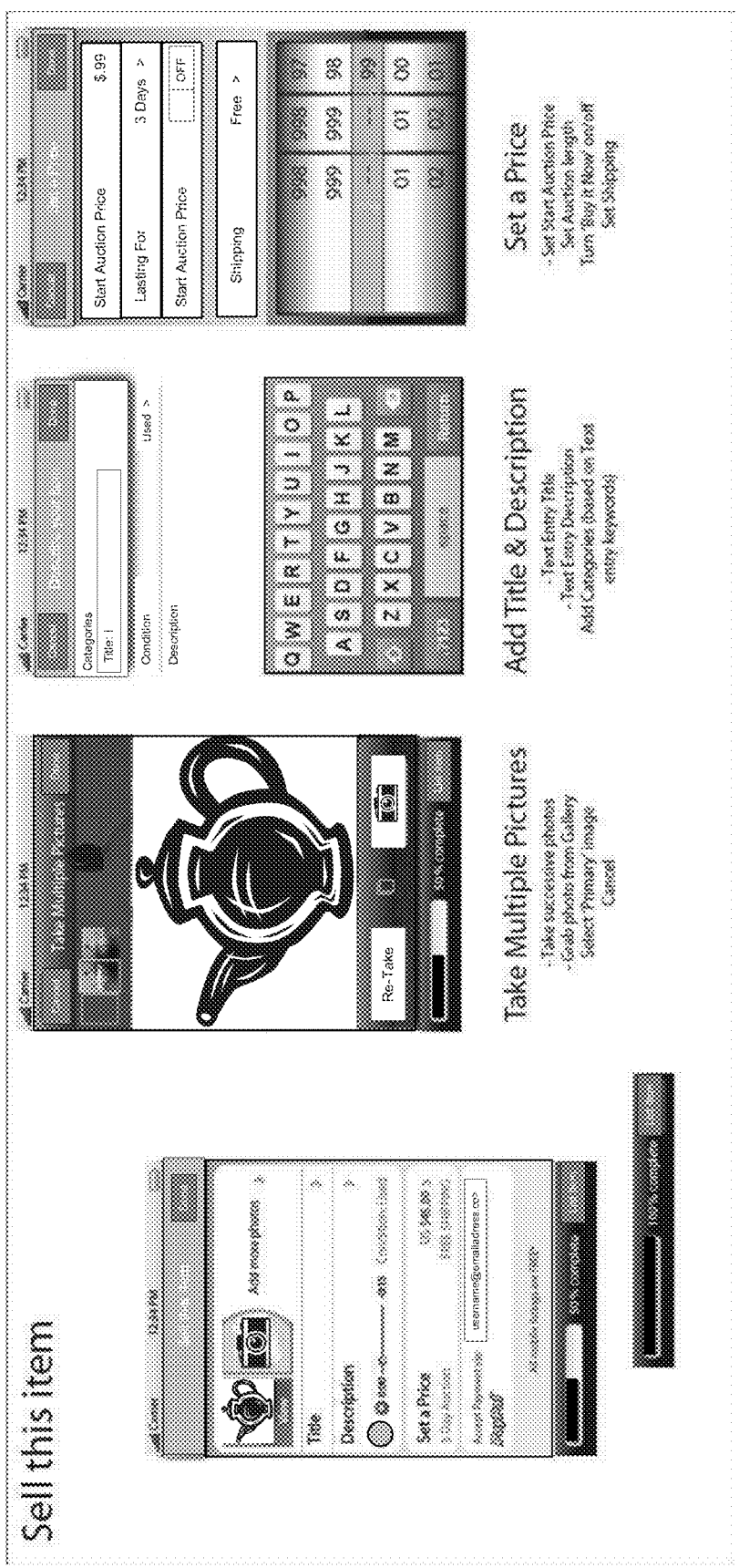

FIG. 7a and FIG. 7b depict example user interfaces that may be presented to a user of the client device 106 to create the listing. FIG. 7a illustrates a flow of user interfaces that may be presented to a user in order to enable the user to provide image data to the server device. A client device embodied as a mobile device 702 is shown. The mobile device 702 comprises a display area 704, which includes several selector buttons. As shown, the selector buttons include a "take photo" button 706 and a "choose existing photo" button 708.

By selecting the "take photo" button 706, a take photo interface 710 is provided to in the display area 704. The take photo interface 710 provides a viewfinder display of an item of interest. In this example, the item of interest is a vintage green teapot. In some embodiments, an image of some other identifier (e.g., a bar code) associated with an item may be utilized.

Once the image is taken, a preview interface 712 is displayed. In the present example, the preview interface 712 will display the captured image of the vintage green teapot. The user may decide to retake the image if the captured image is not acceptable. Alternatively, the user may accept the image.

User selection of the "choose existing photo" button 708 invokes a flow through a series of selection interfaces, which flow to the "my shots" interface 714. The button 708 allows selection of a category from photo albums stored or associated with the mobile device 702 as illustrated in interface 716. The interface 718 allows selection of a single image for further processing. The preview interface 712 allows preview of the captured image (e.g., picture the camera took) or the selected image.

Once a user selects an image (e.g., a captured image or existing image), the user may describe the image. The "my shots" interface 714 illustrates an example display on the mobile device 702 when an analysis process occurs. The "my shots" interface 714 indicates that the selected image is being analyzed by the networked system 102 (e.g., has been uploaded from the mobile device 702, and is being subject to an item recognition process). The "my shots" interface 714 also presents the user with an option of either transacting an item represented in the image (e.g., "sell this item") or searching for an item similar to the item depicted in the selected image (e.g., "search for similar").

In some embodiments, the user may decide to perform other actions with the selected image. Interface 720 shows an example interface for selecting other actions. As illustrated, the interface 720 allows the user to search for a similar item, sell the item, send the image via e-mail, or cancel any action.

In conjunction with the "sell this item" option, a user is presented with an option of providing further description pertaining to the item to be sold. To this end, the user may be presented with a pre-populated template comprising attribute data retrieved, for example, from other listings that include images depicting similar items. For example, a description pertaining to a "vintage green teapot" may be retrieved from other listings associated with the networked system 102, for items visually similar to the vintage green teapot. The template may also be pre-populated with price information that is derived from a price at which such other similar items (e.g., vintage green teapots) are offered for sale via the listing service (e.g., an average price at which such items are offered for sale).

FIG. 7b illustrates a flow of user interfaces that may be presented to a user in order to enable the user to provide supplemental descriptive information (e.g., modified data) pertaining to the item of interest and to be included in a listing for the item. Input into any one of the user interfaces as illustrated in FIG. 7b may be facilitated by the voice recognition module 110 of the mobile device 702. Alternatively, text may be entered, for example, via a (virtual or actual) keyboard of the mobile device 702 as shown in FIG. 7b. The input may include, for example, one or more of a title, description, or price for the item. The user may also provide additional images for inclusion in the listing.

Providing the modified data is optional. A user may elect not to further describe the item and rely purely on descriptive information identified by networked system 102 and used to pre-populate the template. Thus, one example embodiment may enable a user to simply sell an item by taking a picture thereof, and selecting the "sell this item" option 722 of FIG. 7a without requiring further input from the user. In this example, the price of the item may be set using an average price of one or more similar items identified by the item recognition module 304 of the networked system 102.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 8:
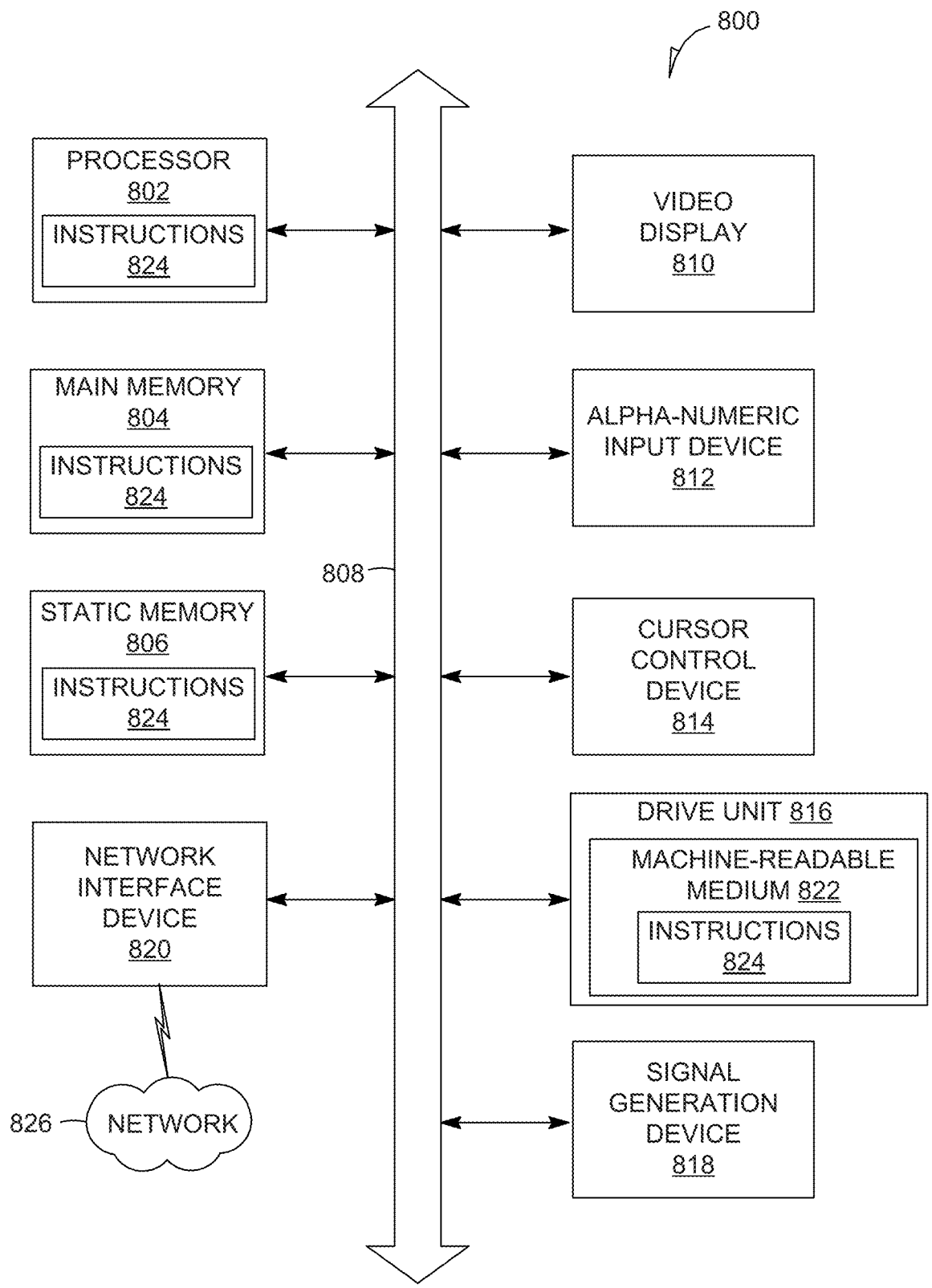
FIG. 8 is a simplified block diagram of a machine in an example form of a computing system within which a set of instructions for causing the machine to perform any one or more of the methodologies discussed herein may be executed.

With reference to FIG. 8, an example embodiment extends to a machine in the example form of a computer system 800 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 may include a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). In example embodiments, the computer system 800 also includes one or more of an alpha-numeric input device 812 (e.g., a keyboard), a user interface (UI) navigation device or cursor control device 814 (e.g., a mouse), a disk drive unit 816, a signal generation device 818 (e.g., a speaker), and a network interface device 820.

Machine-Readable Medium

The disk drive unit 816 includes a machine-readable medium 822 on which is stored one or more sets of instructions 824 and data structures (e.g., software instructions) embodying or used by any one or more of the methodologies or functions described herein. The instructions 824 may also reside, completely or at least partially, within the main memory 804 or within the processor 802 during execution thereof by the computer system 800, with the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 824 may further be transmitted or received over a communications network 826 using a transmission medium via the network interface device 820 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
receiving, at a server system, image data of an item from a client device;
identifying, using one or more processors of the server system, a similar item from an image catalog based on the image data of the item;
retrieving item attribute information associated with the similar item;
populating a first template with the item attribute information associated with the similar item;
receiving, at the server system modified data from the client device;
constructing a second template by modifying the first template using the modified data; and
generating a listing based on the second template.

2. The method of claim 1, wherein the modified data includes a verbal description of the item, the verbal description of the item being converted into text data that is used to modify the first template.

3. The method of claim 1, further comprising:
receiving, at the server system, voice data from the client device, the voice data including instructions to modify the first template; and
converting the voice data into text data, wherein the constructing the second template by modifying the first template comprises modifying the first template based on the converted text data.

4. The method of claim 1, wherein the listing includes an electronic publication to a network-based publication system or an electronic advertisement published on a network-based marketplace.

5. The method of claim 1, wherein the image data is received from a set of listings submitted to the server system by the client device.

6. The method of claim 1, wherein the image data is transmitted from a commercial source, wherein the commercial source includes an item inventory.

7. The method of claim 1, wherein the identifying of the similar item based on the image data includes:
performing an image recognition process on the image data.

8. The method of claim 7, wherein the image recognition process comprises:
in response to receiving the image data, matching the image data received from the client device with the item attribute information associated with the similar item in the image catalog;
receiving a verbal description of the item;
in response to receiving the verbal description of the item, converting the verbal description into text data; and
matching the text data with the item attribute information associated with the similar item from the image catalog.

9. A system comprising:
one or more processors; and
a memory device including instructions that, when executed by the one or more processors, cause the one or more processors to perform operations comprising:
receiving image data of an item from a client device;
identifying a similar item from an image catalog based on the image data of the item;
retrieving item attribute information associated with the similar item;
populating a first template with the item attribute information associated with the similar item;
receiving modified data from the client device;
constructing a second template by modifying the first template with the modified data; and
generating a listing based on the second template.

10. The system of claim 9, wherein the modified data includes a verbal description of the item, the verbal description of the item being converted into text data that is used to modify the first template.

11. The system of claim 9, wherein the operations further comprise:
receiving voice data from the client device, the voice data including instructions to modify the first template; and
converting the voice data into text data, wherein the constructing the second template by modifying the first template comprises modifying the first template based on the converted text data modify the first template based on the converted text data.

12. The system of claim 9, wherein the listing includes an electronic publication to a network-based publication system or an electronic advertisement published on a network-based marketplace.

13. The system of claim 9, wherein the image data is received from a set of listings submitted to the system by the client device.

14. The system of claim 9, wherein the image data is transmitted from a commercial source, wherein the commercial source includes an item inventory.

15. The system of claim 9, wherein the identifying the similar item based on the image data comprises executing image recognition on the image data.

16. The system of claim 15, wherein the executing image recognition on the image data comprises:
in response to receiving the image data, matching the image data from the client device with the item attribute information associated with the similar item in the image catalog;
receiving a verbal description of the item;
in response to receiving the verbal description of the item, converting the verbal description into text data; and
matching the text data with the item attribute information associated with the similar item from the image catalog.

17. A non-transitory machine-readable storage medium storing instructions which, when executed by the at least one processor of a machine, cause the machine to perform operations comprising:
receiving image data of an item from a client device;
identifying a similar item from an image catalog based on the image data of the item;
retrieving item attribute information associated with the similar item;
populating a first template with the item attribute information associated with the similar item;
receiving modified data from the client device;
constructing a second template by modifying the first template with the modified data; and
generating a listing based on the second template.

18. The non-transitory machine-readable storage medium of claim 17, wherein the operations further comprise:
receiving voice data from the client device, the voice data including instructions to modify the first template; and
converting the voice data into text data, wherein the constructing the second template by modifying the first template comprises modifying the first template based on the converted text data modify the first template based on the converted text data.

19. The non-transitory machine-readable storage medium of claim 17, wherein the identifying the similar item based on the image data further comprises executing image recognition on the image data.

20. The non-transitory machine readable storage medium of claim 19, wherein the executing image recognition on the image data comprises:
- in response to receiving the image data, matching the image data from the client device with the item attribute information associated with the similar item in the image catalog;
- receiving a verbal description of the item;
- in response to receiving the verbal description of the item, converting the verbal description into text data; and
- matching the text data with the item attribute information associated with the similar item depicted by the image data from the image catalog.

* * * * *